Patented Aug. 12, 1930

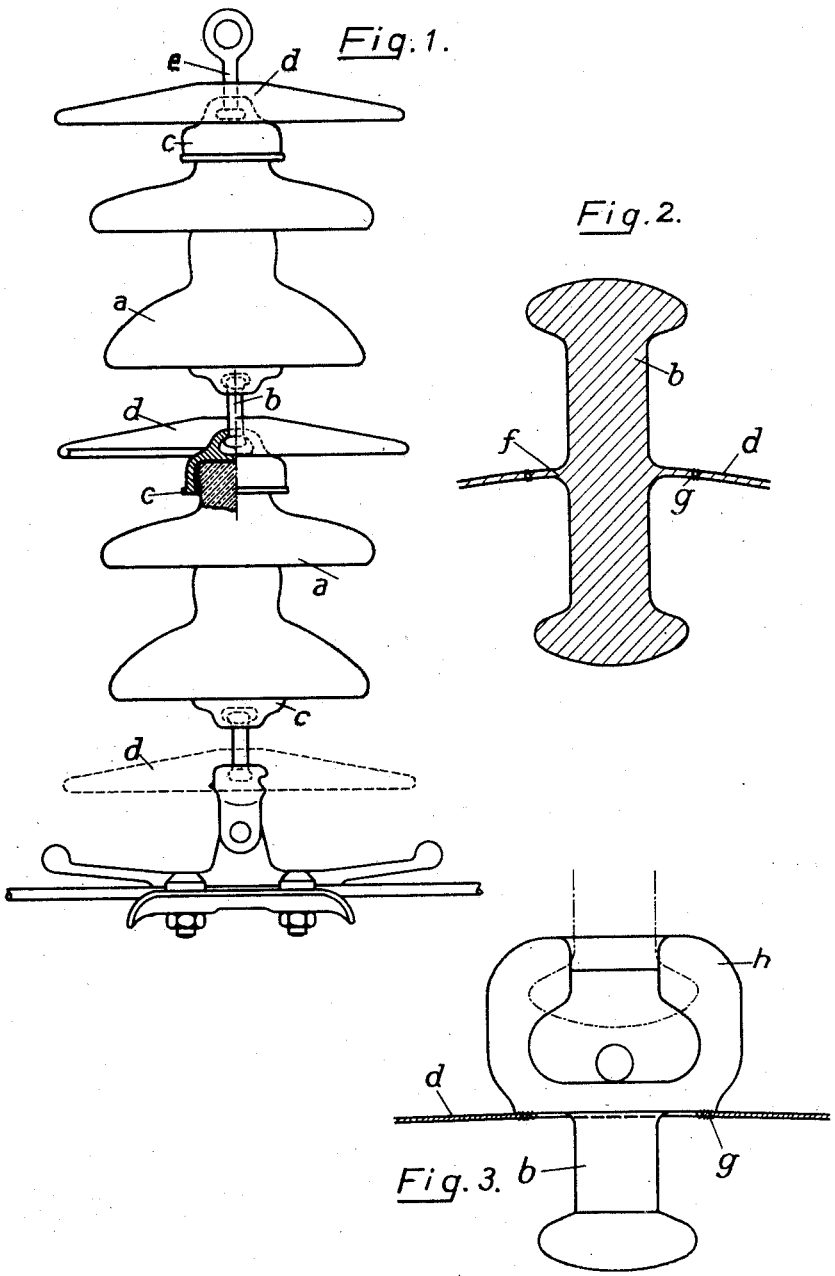

1,772,947

UNITED STATES PATENT OFFICE

GOTTFRIED HOFFMANN, OF ENNETBADEN, SWITZERLAND, ASSIGNOR TO MOTOR-COLUMBUS AKTIENGESELLSCHAFT FÜR ELEKTRISCHE UNTERNEHMUNGEN, OF BADEN, SWITZERLAND

ELECTRIC INSULATOR

Application filed September 3, 1926, Serial No. 133,491, and in Germany November 11, 1925.

It has already been proposed to provide chains of insulators with metal petticoats, rings or stirrups which act partly as a protection against rain, partly as a means for improving the electric field and partly as a means for protecting the insulator body from arcing. These members, have hitherto generally been fixed to the mount or to the caps of the insulators, the sheet metal petticoats for instance being fixed to the caps by soldering. Such a method is inconvenient more particularly for the reason that the soldering has to be carried out in the pottery, so that it is outside the ordinary routine work of such an establishment.

For insulators of the Hewlett type it has aleready ben proposed to fix the protective stirrups and petticoats to the connecting ropes of the separate insulator members of the chain.

But with suspension insulators having rigid connecting members between the separate insulating members it has already been proposed to attach metal petticoats and protective stirrups to the rigid connecting members. For this purpose the rigid connecting members have been threaded and the protective member has either itself been made with a female thread or has been clamped between nuts. Such a screw connection is, however, not rain proof. The thread becomes filled with water and, as the zinc coating is bound to become damaged when the parts are being screwed together, the latter will become rusty so that such insulators cannot be used in practice.

According to the invention an arrangement of the protective members for suspension chains with insulators of the rigid member or dumb-bell type is provided which is readily put together and taken apart and is simple to manufacture. This is effected by the protective members being connected directly to the rigid member and to the suspension eye rigidly and so that they cannot become detached in ordinary use.

According to the invention insulators, the insulating members of which are connected together by means of rigid bolts or dumbbell shaped members, can have the protective members attached to them in a suitable and convenient manner. This is effective by the protective member being connected directly to the connecting bolts or to its supporting eye which is also a rigid member.

In Fig. 1 of the accompanying drawing a constructional example of the invention is shown representing a chain of insulators comprising two bells $a$ which are provided with metal caps $c$ and are linked together by dumbbell shaped members $b$, at the middle of each of which a metal petticoat $d$ is provided. A petticoat $d$ is also fixed to the supporting eye $e$. Preferably the sheet metal petticoat $d$ is welded to a flange $f$ on the dumbbell shaped member $b$, as is shown in Fig. 2, which represents a longitudinal section through a dumbbell shaped member, $g$, indicating the welded seam. This improved construction has the advantage of being very simple to put together while in the case of chains of insulators already in position in the lines, such protective members can be inserted without any difficulty.

If one end of the dumbbell shaped member has the form of a socket for receiving a second dumbbell shaped member, the petticoat $d$ may be fixed to the shoulder formed by the socket $h$ as shown in Fig. 3.

Instead of the protective members being welded to the dumbbell shaped members or the supporting eyes, they may be soldered or pressed on them.

What I claim is:

An insulator string having dumb-bell shaped members linking the insulating units of the string together, ring-shaped protective members, the opening thereof being of a diameter greater than that of the heads of the dumb-bell shaped members to permit passage of said heads therethrough, annular flanges carried by the dumb-bell shaped members and disposed between the heads thereof, the peripheries of said flanges being adapted to contact with the peripheries of the openings of the protective members and weld connections between the flanges and protective members.

In testimony whereof I have signed my name to this specification.

GOTTFRIED HOFFMANN.